US008991369B2

(12) United States Patent
Huelsmann

(10) Patent No.: US 8,991,369 B2
(45) Date of Patent: Mar. 31, 2015

(54) TWO-STAGE COOLED EXHAUST GAS RECIRCULATION SYSTEM

(75) Inventor: Bernd Huelsmann, Langenfeld (DE)

(73) Assignee: Deutz Aktiengesellschaft, Cologne (DE)

( * ) Notice: Subject to any disclaimer, the term of this patent is extended or adjusted under 35 U.S.C. 154(b) by 1042 days.

(21) Appl. No.: 12/998,175

(22) PCT Filed: Sep. 30, 2009

(86) PCT No.: PCT/EP2009/007033
§ 371 (c)(1),
(2), (4) Date: Mar. 24, 2011

(87) PCT Pub. No.: WO2010/037540
PCT Pub. Date: Apr. 8, 2010

(65) Prior Publication Data

US 2011/0168142 A1 Jul. 14, 2011

(30) Foreign Application Priority Data

Oct. 2, 2008 (DE) ........................ 10 2008 050 368

(51) Int. Cl.
*F02B 47/08* (2006.01)
*F02M 25/07* (2006.01)

(52) U.S. Cl.
CPC ....... *F02M 25/0713* (2013.01); *F02M 25/0707* (2013.01); *F02M 25/0732* (2013.01); *F02M 25/0751* (2013.01); *F02M 25/0744* (2013.01); *F02M 25/0745* (2013.01);
(Continued)

(58) Field of Classification Search
CPC .............. F02M 25/07; F02M 25/0704; F02M 25/0707; F02M 25/071; F02M 25/0715
USPC ........................ 60/605.2, 278, 280, 298, 599; 123/568.11, 568.12, 568.18, 568.2; 701/108
See application file for complete search history.

(56) References Cited

U.S. PATENT DOCUMENTS 6,062,027 A 5/2000 Landfahrer et al. .......... 60/605.2
6,244,256 B1 6/2001 Wall et al.
7,059,308 B2 6/2006 Eitel et al. ..................... 123/568
(Continued)

FOREIGN PATENT DOCUMENTS

DE 198 21 792 A1 12/1998
DE 197 34 801 A1 2/1999
(Continued)

*Primary Examiner* — Mahmoud Gimie
*Assistant Examiner* — Sizo Vilakazi
(74) *Attorney, Agent, or Firm* — Davidson, Davidson & Kappel, LLC

(57) ABSTRACT

A device for cooled recirculation of exhaust gas of an internal combustion engine charged with the aid of an exhaust gas turbocharger, the internal combustion engine having a fresh gas system and an exhaust gas system, which are connected to a two-stage exhaust gas cooler via an exhaust gas recirculation line. A device by way of which a sufficient amount of exhaust gas may be recirculated by simple means is provided. This is achieved in that exhaust gas recirculation line 8*a*, 8*b* is connected to an exhaust gas collecting line 7*a*, 7*b* of the exhaust gas system upstream from turbine 6 of exhaust gas turbocharger 5 in the direction of flow, an exhaust gas recirculation valve 9*a*, 9*b* being connected upstream from first stage 10*a*, 10*b* of the exhaust gas cooler in exhaust gas recirculation line 8*a*, 8*b*, and a nonreturn valve 11*a*, 11*b* is inserted into a continuation line 12*a*, 12*b* leading to the second stage of the exhaust gas cooler.

8 Claims, 1 Drawing Sheet

(52) U.S. Cl.
CPC ....... *F02M 25/0749* (2013.01); *F02M 25/0779* (2013.01); *Y02T 10/121* (2013.01)
USPC ........................................................ 123/568.12

(56) References Cited

U.S. PATENT DOCUMENTS

| | | | | |
|---|---|---|---|---|
| 7,171,957 | B2 * | 2/2007 | Liu et al. | 123/568.12 |
| 7,299,793 | B1 * | 11/2007 | Tyo et al. | 123/568.12 |
| 8,061,335 | B2 * | 11/2011 | Auffret et al. | 123/568.12 |
| 2004/0074480 | A1 * | 4/2004 | Chen et al. | 123/568.12 |
| 2004/0194463 | A1 * | 10/2004 | Yanagisawa et al. | 60/605.2 |
| 2005/0199229 | A1 * | 9/2005 | Eitel et al. | 123/568.12 |
| 2006/0101819 | A1 | 5/2006 | Schorn et al. | 60/602 |
| 2006/0200297 | A1 * | 9/2006 | Liu et al. | 701/104 |
| 2006/0248888 | A1 | 11/2006 | Geskes | |
| 2007/0204619 | A1 * | 9/2007 | Pelz et al. | 60/605.2 |
| 2008/0149080 | A1 * | 6/2008 | Reuss et al. | 123/568.12 |
| 2009/0320467 | A1 * | 12/2009 | Kardos et al. | 60/605.2 |
| 2011/0185991 | A1 * | 8/2011 | Sheidler et al. | 123/41.09 |

FOREIGN PATENT DOCUMENTS

| | | | |
|---|---|---|---|
| DE | 100 18 503 | A1 | 10/2001 |
| DE | 60024390 | | 8/2006 |
| DE | 10 2005 017 905 | A1 | 10/2006 |
| DE | 102005017905 | | 10/2006 |
| DE | 10 2006 057 488 | A1 | 6/2008 |
| EP | 1 464 823 | A | 10/2004 |
| EP | 1464823 | | 10/2004 |
| EP | 1 640 594 | A | 3/2006 |
| WO | WO 2004/038191 | A | 5/2004 |
| WO | WO 2004/051069 | A | 6/2004 |
| WO | WO 2005/095780 | A | 10/2005 |
| WO | WO 2006/096346 | A | 9/2006 |

* cited by examiner

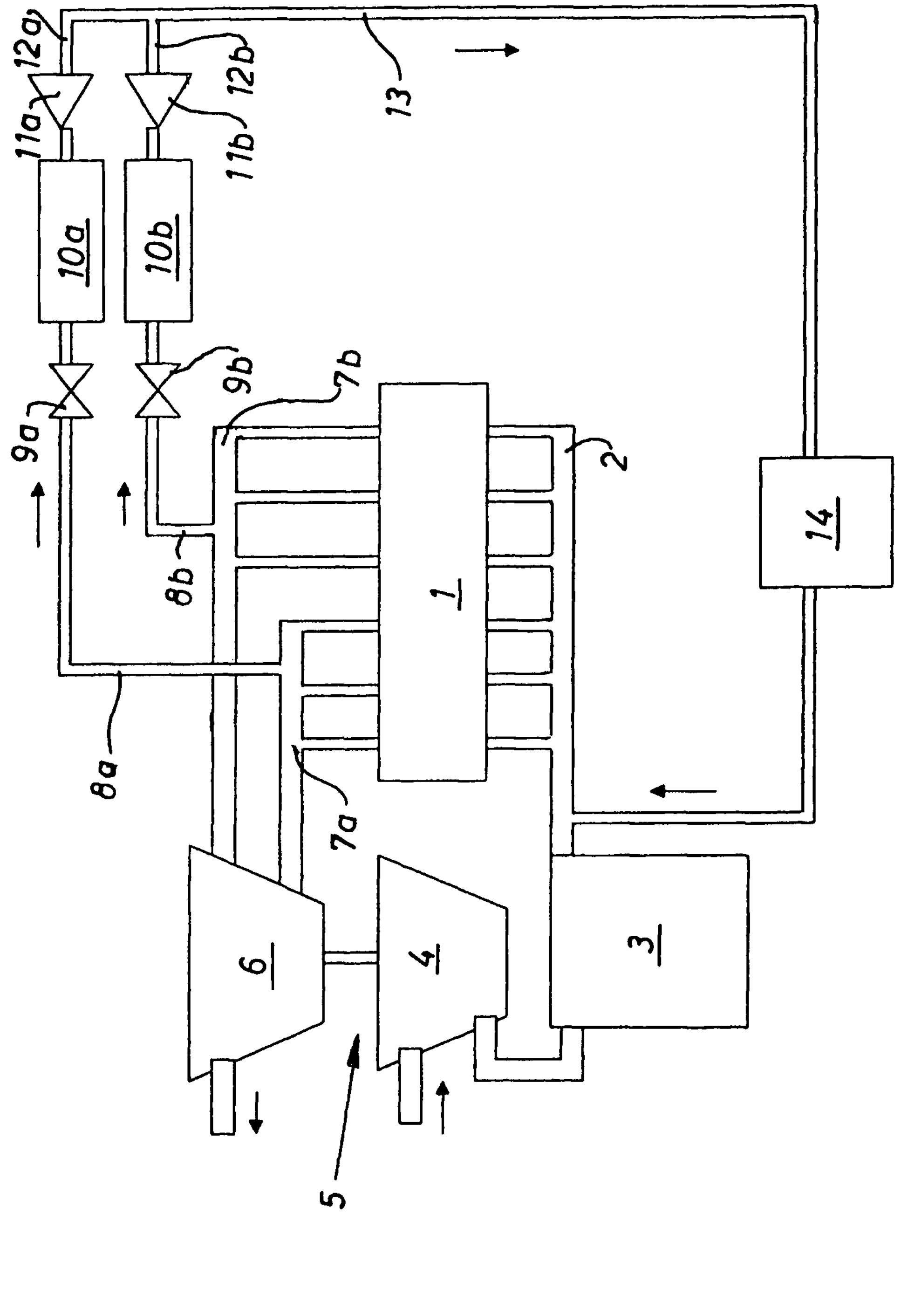
12a
12b
11a
11b
10a
10b
13
9a
9b
7b
2
8b
1
14
8a
7a
6
4
3
5

TWO-STAGE COOLED EXHAUST GAS RECIRCULATION SYSTEM

The present invention relates to a device for cooled recirculation of exhaust gas of an internal combustion engine charged with the aid of an exhaust gas turbocharger, the internal combustion engine having a fresh gas system and an exhaust gas system, which are connected to a two-stage exhaust gas cooler via an exhaust gas recirculation line.

BACKGROUND

Such a device is known from DE 10 2005 017 905 A1. In the system presented in this document, an exhaust gas recirculation line branches off from the exhaust gas line downstream from the turbine of an exhaust gas turbocharger, and the exhaust gas to be recirculated is raised to a higher pressure level by a separate compressor and then introduced into the fresh air line downstream from a charge air cooler.

SUMMARY OF THE INVENTION

It is an object of the present invention to provide a device with which a sufficient quantity of exhaust gas may be recirculated using simple means.

The present invention provides an exhaust gas recirculation line connected to an exhaust gas collecting line of the exhaust gas system upstream from the turbine of the exhaust gas turbocharger in the direction of flow; an exhaust gas recirculation valve is inserted into the exhaust gas recirculation line upstream from the first stage of the exhaust gas cooler, and a nonreturn valve is installed in a continuation line to the second stage of the exhaust gas cooler. Due to this design, a complex separate compressor for the recirculated gas becomes irrelevant, and due to the use of the nonreturn valve, the pressure pulsations prevailing in the exhaust gas system are utilized to yield a sufficient exhaust gas recirculation rate. An important aspect to achieve the required recirculation rates is to provide the nonreturn valve between the first stage of the exhaust gas cooler and the second stage of the exhaust gas cooler. This configuration utilizes the pulsation of the exhaust gas, which is pronounced at this location, to implement the desired exhaust gas recirculation rate in all operating states and under all operating conditions of the internal combustion engine. Placing the nonreturn valve downstream from the second stage of the exhaust gas cooler would result in lower recirculation rates because the pulsation is definitely degraded due to the available line volume and cooler volume up to this point. In addition, experiments have revealed that due to the mass inertia of the larger exhaust gas recirculation mass in the exhaust gas recirculation system during dynamic operation, the responding behavior of the internal combustion engine and the controllability of the exhaust gas recirculation rate are impaired. Finally, at relatively low temperatures downstream from the second stage of the exhaust gas cooler, the coking tendency of the nonreturn valve increases. These disadvantages are avoided according to the present invention by placing the nonreturn valve between the first stage of the exhaust gas cooler and the second stage of the exhaust gas cooler. Placing the nonreturn valve directly at the outlet of the first stage of the exhaust gas cooler is particularly advantageous here.

In a refinement of the present invention, the exhaust gas recirculation line to the first stage of the exhaust gas cooler has a multi-flow design including two activated exhaust gas recirculation valves. Together with the multi-flow design of the first stage of the exhaust gas cooler and the continuation line having a nonreturn valve assigned to it, provided in a further embodiment, small volumes which are used to maintain and utilize the pulsations in the exhaust gas stream are implemented up to the nonreturn valves. This effect is further utilized when the exhaust gas collecting line, also having a multi-flow design, is connected to the same number of adjacent cylinders and separate inlets into the turbine of the exhaust gas turbocharger. Pulsations in the exhaust gas stream are therefore continued in a targeted manner to the nonreturn valves.

In a further embodiment of the present invention, the continuation lines are brought together to a single-flow line downstream from the nonreturn valves, and this line then opens into the fresh gas line of the internal combustion engine with flow-through of the second stage of the exhaust gas cooler.

BRIEF DESCRIPTION OF THE DRAWING

FIG. 1—FIG. 1 shows an internal combustion engine.

DETAILED DESCRIPTION

Additional advantageous embodiments of the present invention may be derived from the description of the drawings, an exemplary embodiment shown in the FIGURE being described in greater detail.

An internal combustion engine, which is schematically shown in the exemplary embodiment in FIG. 1, is a six-cylinder auto-ignition internal combustion engine in a series design having a fresh gas system and an exhaust gas system. The fresh gas system has a charge air line 2, which connects all the inlet valves of the individual cylinders to one another and to compressor 4 of an exhaust gas turbocharger 5 via a charge air cooler 3. Turbine 6 of exhaust gas turbocharger 5 is driven by the exhaust gases of the internal combustion engine, the exhaust gases being carried from the outlet channels in the cylinder head of internal combustion engine 1 via exhaust gas collecting lines 7*a*, 7*b* to the two separate inlets into turbine 6. Two exhaust gas collecting lines 7*a*, 7*b* are each assigned to three adjacent cylinders of the internal combustion engine.

Exhaust gas recirculation lines 8*a*, 8*b* branch off from exhaust gas collecting lines 7*a*, 7*b*, removing exhaust gas from exhaust gas collecting lines 7*a*, 7*b* and sending it to first stage 10*a*, 10*b* of a two-stage exhaust gas cooler, via exhaust gas recirculation valves 9*a*, 9*b* which are connected to exhaust gas recirculation lines 8*a*, 8*b*. From first stage 10*a*, 10*b* of the exhaust gas cooler the cooled exhaust gas reaches a single-flow recirculation line 13 via nonreturn valves 11*a*, 11*b*, which are inserted into continuation lines 12*a*, 12*b* directly downstream from first stage 10*a*, 10*b*. Recirculation line 13 carries the recirculated exhaust gas further via second stage 14 of the exhaust gas cooler back into charge air line 2. Like second stage 14, first stage 10*a*, 10*b* of the exhaust gas cooler is water-cooled, but it is also possible to provide for the second stage to be cooled with cooling air in particular. First stage 10*a*, 10*b* cools the exhaust gas to temperatures lower than 180° C., and the second stage cools it to a temperature in the range of 70° C. or lower, depending on the temperature of the cooling water of the low temperature circuit.

LIST OF REFERENCE NUMERALS

1 internal combustion engine
2 charge air line
3 charge air cooler
4 compressor

5 exhaust gas turbocharger
6 turbine
7*a*, 7*b* exhaust gas collecting line
8*a*, 8*b* exhaust gas recirculation line
9*a*, 9*b* exhaust gas recirculation valve
10*a*, 10*b* stage I
11*a*, 11*b* nonreturn valve
12*a*, 12*b* continuation line
13 recirculation line
14 stage II

The invention claimed is:

1. A device for cooled recirculation of exhaust gas of an internal combustion engine charged with the aid of an exhaust gas turbocharger, the internal combustion engine having a fresh gas system and an exhaust gas system, the device comprising:

an exhaust gas recirculation line connecting a two-stage exhaust gas cooler to the fresh gas system and the exhaust gas system, the exhaust gas recirculation line being connected to an exhaust gas collecting line of the exhaust gas system in a direction of flow upstream from the turbine of the exhaust gas turbocharger;

an exhaust gas recirculation valve connected in the exhaust gas recirculation line upstream from a first stage of the exhaust gas cooler; and a nonreturn valve inserted into a continuation line to a second stage of the exhaust gas cooler, the recirculation line opening into the fresh gas system downstream from the second stage of the exhaust gas cooler.

2. The device as recited in claim 1 wherein the exhaust gas recirculation line to the first stage of the exhaust gas cooler has a multi-flow design including the exhaust gas recirculation valve and a further exhaust gas recirculation valve.

3. The device as recited in claim 2 wherein the first stage of the exhaust gas cooler has a multi-flow design.

4. The device as recited in claim 2 wherein the continuation line has a multi-flow design with at least two branches, each branch of the continuation line having an assigned nonreturn valve.

5. The device as recited in claim 4 wherein the branches of the continuation line are brought together downstream from the nonreturn valves to form a single-flow recirculation line.

6. The device as recited in claim 1 wherein the exhaust gas collecting line has a multi-flow design with at least two branches, each branch having an equal number of adjacent cylinders and separate inlets into the turbine.

7. The device as recited in claim 1 wherein the recirculation line opens into the fresh gas system downstream from a charge air cooler, the charge air cooler being downstream from a compressor of the exhaust gas turbocharger.

8. The device as recited in claim 7 wherein the recirculation line is configured such that gas exiting the second stage of the exhaust gas cooler joins the fresh gas system exiting the charge air cooler.

* * * * *